United States Patent
Mackensen et al.

(10) Patent No.: US 10,958,077 B2
(45) Date of Patent: Mar. 23, 2021

(54) METHOD FOR GENERATING AN ALTERNATING CURRENT BY MEANS OF AN INVERTER OF A WIND TURBINE

(71) Applicant: Wobben Properties GmbH, Aurich (DE)

(72) Inventors: Ingo Mackensen, Aurich (DE); Stefan Gertjegerdes, Aurich (DE)

(73) Assignee: Wobben Properties GmbH, Aurich (DE)

( * ) Notice: Subject to any disclaimer, the term of this patent is extended or adjusted under 35 U.S.C. 154(b) by 157 days.

(21) Appl. No.: 16/334,663

(22) PCT Filed: Sep. 22, 2017

(86) PCT No.: PCT/EP2017/074035
§ 371 (c)(1),
(2) Date: Mar. 19, 2019

(87) PCT Pub. No.: WO2018/055089
PCT Pub. Date: Mar. 29, 2018

(65) Prior Publication Data
US 2020/0350769 A1 Nov. 5, 2020

(30) Foreign Application Priority Data

Sep. 23, 2016 (DE) ..................... 10 2016 117 964.7

(51) Int. Cl.
*H02J 3/38* (2006.01)
*F03D 9/25* (2016.01)
(Continued)

(52) U.S. Cl.
CPC ............ *H02J 3/381* (2013.01); *F03D 7/0272* (2013.01); *F03D 7/043* (2013.01); *F03D 9/25* (2016.05);
(Continued)

(58) Field of Classification Search
CPC ......... H02J 3/381; H02J 2300/28; F03D 9/25; F03D 7/0272; F03D 7/043; H02M 1/126
(Continued)

(56) References Cited

U.S. PATENT DOCUMENTS 6,459,596 B1 10/2002 Corzine
7,782,644 B2 * 8/2010 Sadwick .................. H02M 7/12
363/163
(Continued)

FOREIGN PATENT DOCUMENTS

AT 405586 B 9/1999
CN 101501972 A 8/2009
(Continued)

OTHER PUBLICATIONS

Sae-Sue et al., "Comparative Performance Evaluation of Fixed and Adaptive Hysteresis Band Delta Modulation Techniques for UPS," *IEEE 1999 International Conference on Power Electronics and Drive Systems*, PEDS'99, Hong Kong, Jul. 1999, pp. 956-960.

*Primary Examiner* — Pedro J Cuevas
(74) *Attorney, Agent, or Firm* — Seed IP Law Group LLP (57) ABSTRACT

Provided is a method for generating a multiphase electrical alternating current having a sinusoidal fundamental wave in each phase by a multiphase inverter of a wind power installation. The multiphase inverter is controlled by a tolerance band method which respectively has an upper and a lower band limit for each of the phases of the inverter. The inverter has, for each phase, an upper switch for generating a positive sine half-wave of the alternating current of the phase and a lower switch for generating a negative sine half-wave of the alternating current of the phase. The method includes generating the positive sine half-wave by the upper switch and generating the negative sine half-wave by the lower switch based on the band limits of the phase,
(Continued)

and changing at least one of the band limits such that a signal component superimposed on the respective sinusoidal fundamental wave is reduced.

18 Claims, 5 Drawing Sheets

(51) Int. Cl.
    *F03D 7/02*     (2006.01)
    *F03D 7/04*     (2006.01)
    *H02M 1/12*     (2006.01)

(52) U.S. Cl.
    CPC ......... *H02M 1/126* (2013.01); *H02J 2300/28* (2020.01)

(58) Field of Classification Search
    USPC .................................................... 290/44, 55
    See application file for complete search history.

(56) References Cited

U.S. PATENT DOCUMENTS

| | | | | |
|---|---|---|---|---|
| 8,009,452 B1* | 8/2011 | Sadwick | ............... | H02M 3/335 363/149 |
| 8,421,389 B2 | 4/2013 | Fraeger | | |
| 8,422,249 B2* | 4/2013 | Cooper | ................... | H02J 3/381 363/17 |
| 8,446,741 B1* | 5/2013 | Sadwick | ............... | H02M 3/335 363/10 |
| 9,362,837 B2 | 6/2016 | Diedrichs et al. | | |
| 2008/0211468 A1* | 9/2008 | Sadwick | ................. | H02M 7/12 323/272 |
| 2011/0227422 A1 | 9/2011 | Kumar et al. | | |
| 2013/0051092 A1* | 2/2013 | Cooper | ................... | H02J 3/381 363/37 |
| 2013/0058144 A1 | 3/2013 | Hiramatsu et al. | | |
| 2013/0235630 A1* | 9/2013 | Sadwick | ................. | H05K 3/30 363/74 |
| 2017/0284370 A1 | 10/2017 | Gensior | | |
| 2020/0003181 A1* | 1/2020 | Brombach | ................ | H02J 3/18 |
| 2020/0176993 A1* | 6/2020 | Brombach | .............. | F03D 9/257 |

FOREIGN PATENT DOCUMENTS

| | | |
|---|---|---|
| CN | 104135021 A | 11/2014 |
| DE | 10249122 A1 | 5/2004 |
| DE | 102011084910 A1 | 4/2013 |
| DE | 102014219052 A1 | 3/2016 |
| EP | 0456854 A1 | 11/1991 |
| EP | 3249799 A1 | 11/2017 |
| JP | S6022490 A | 2/1985 |
| JP | H07308072 A | 11/1995 |

* cited by examiner

Fig.5

METHOD FOR GENERATING AN ALTERNATING CURRENT BY MEANS OF AN INVERTER OF A WIND TURBINE

BACKGROUND

Technical Field

The present invention relates to a method for generating an electrical alternating current by means of a multiphase inverter of a wind power installation. The present invention also relates to a method for feeding in an electrical alternating current by means of a full converter of a wind power installation. Furthermore, the invention also relates to a wind power installation which is configured to carry out such methods.

Description of the Related Art

For wind power installations, in particular, it is known practice to generate electrical alternating current by means of electrical inverters and to feed electrical alternating current into the electrical supply network by means of electrical inverters.

For this purpose, the electrical inverters usually have a multiphase design and usually have a modular design in high-power wind power installations, that is to say the inverter has a multiplicity of inverter modules which together form the electrical inverter.

A method for controlling such inverters is the so-called tolerance band method.

In this case, a tolerance band having a lower band limit and an upper band limit is placed around a sinusoidal function corresponding to the desired output current of the inverter. In order to carry out a current-controlled tolerance band method, the output current generated is also captured and is compared with the tolerance band, that is to say the lower and upper band limits. If the current is in the positive half-wave and reaches the lower band limit, a switching pulse is triggered and the corresponding switch of the inverter changes the output current. If the captured output current now reaches the upper band limit, the switching pulse is terminated. If the current is in the negative half-wave and reaches the upper band limit, a switching pulse is triggered and the corresponding switch of the inverter changes the output current. If the captured output current now reaches the lower band limit, the switching pulse is terminated. As a result, the current varies within the tolerance band around the predefined, idealized sinusoidal profile, wherein the switches of the inverter continuously turn on and off again and in this case have a variable switching frequency which depends substantially on the width of the tolerance band.

The quality of the alternating current generated can be changed by appropriately selecting the width of the tolerance band, that is to say the distance between the lower and upper band limits. If the band is selected to be narrower, the alternating current accordingly varies less around the ideal sinusoidal profile, but the switching frequency is usually increased as a result since the output current generated also reaches the band limits more quickly as a result of the narrower band limits and therefore triggers a switching action more quickly.

Furthermore, tolerance bands having an amplitude-dependent droop which are accordingly parameterized are usually used to control multiphase wind power installation inverters, that is to say the upper and lower band limits have a distance between one another which is dependent on the current amplitude during ongoing operation. In addition, two switches, in particular IGBTs, which are also referred to as upper and lower switches, are respectively responsible for generating the output current of each phase. In this case, the upper switch generates substantially the positive sine half-wave of the output current and the lower switch generates the negative sine half-wave of the output current, wherein the parameterization of the inverter is set in this case in such a manner that a DC component should not be established in any of the corresponding desired phase values.

However, as a result of component tolerances, for example offsets in the chain of measuring elements, or parasitic effects, the situation may arise in which a DC offset is established in the output current of one or more phases. This DC offset can impair, inter alia, the harmonic spectrum at the output of the inverter and is therefore undesirable.

The component tolerance is usually accordingly adapted for this purpose, that is to say for the purpose of generating an output current which is substantially free of a DC offset, that is to say particularly high requirements are imposed on the components, in particular on the measurement recording components. However, this in turn results in very costly inverter designs.

In the priority application for the present application, the German Patent and Trademark Office researched the following prior art: DE 102 49 122 A1; DE 10 2014 219 052 A1 and JP H07-308 072 A.

BRIEF SUMMARY

Provided is a solution which prevents a DC offset from being established at the output of the inverter in a manner which is as simple and efficient as possible; such a DC offset should at least be kept as low as possible. In particular, the harmonic spectrum of the output current of the inverter should therefore be improved without resorting to particularly costly components having an extremely low component tolerance.

Provided is a method for generating a multiphase electrical alternating current having a sinusoidal fundamental wave in each phase by means of a multiphase inverter of a wind power installation is therefore proposed, wherein the multiphase inverter is controlled by means of a tolerance band method which respectively has an upper band limit and a lower band limit for each of the phases of the inverter, and wherein the inverter has, for each phase, at least one upper switch for generating a positive sine half-wave of the alternating current of the phase and at least one lower switch for generating a negative sine half-wave of the alternating current of the phase. This method comprises the steps of generating the positive sine half-wave by means of the upper switch and generating the negative sine half-wave by means of the lower switch on the basis of the band limits for the electrical alternating current of the phase, and changing at least one of the band limits in such a manner that a signal component superimposed on the respective sinusoidal fundamental wave is reduced.

It is therefore possible to initially use a normal tolerance band method with tolerance bands of normal width. If a DC offset is now established in one of the phases or if the phase has a corresponding harmonic, for example, this can be counteracted by changing one of the band limits of the corresponding phase.

For example, the lower band limit is decreased if the lower switch produces a DC offset in the phase as a result of an excessively high clock frequency.

It is therefore proposed to deliberately change individual band limits in such a manner that a signal component superimposed on the fundamental wave is reduced.

The method is therefore particularly well suited to minimizing the harmonic emissions of inverters with tolerance band methods; in particular, the proposed method can be used as an additional control method for the tolerance band limits.

The DC component is preferably captured for this purpose.

The method is therefore based, in particular, on capturing a DC component. This can be carried out indirectly, for example, by capturing the switching frequencies of the upper and lower switches.

The band limits are then set on the basis of a DC component occurring in the phase.

The switching frequency of the upper or lower switch is therefore changed by changing the upper or lower band limit, in particular is set in such a manner that the upper and lower switches have the same switching frequency as far as possible.

A capture or the capture of the superimposed signal component is preferably carried out by capturing the switching frequency of the upper switch and capturing the switching frequency of the lower switch, in particular by comparing the switching frequencies of the upper switch and of the lower switch.

The superimposed signal component in each phase is therefore captured via the switching frequencies of the upper switch and of the lower switch which allow, in particular, conclusions to be drawn on the current generated with respect to the tolerance band, that is to say with respect to the band limits.

In particular, the switching frequencies of the upper switch and of the lower switch captured in this manner are compared with one another. If the comparison of the two switching frequencies then has a difference, in particular an excessively large difference, that is to say a difference which, in terms of the absolute value, is above a predetermined difference limit, at least one corresponding band is changed in such a manner that this difference is reduced or minimized. For example, the upper band limit is shifted upward if the upper switch has a faster switching frequency than the lower switch.

The upper band limit or alternatively the lower band limit is preferably changed in such a manner that the superimposed signal component is reduced, wherein the lower band limit or the upper band limit remains unchanged.

In order to reduce the superimposed signal component, in particular the DC offset, only one of the two band limits is therefore changed, in particular in such a manner that the switching frequencies of the two switches converge.

The simplified implementation of such a method is particularly advantageous here; since only one band limit is changed here, the method can be applied to existing methods for optimization.

The upper band limit or alternatively the lower band limit is preferably changed in such a manner that the difference in the switching frequency between the upper switch and the lower switch is minimized.

The upper band limit or the lower band limit is preferably changed in such a manner that the switching frequency of the upper switch or of the lower switch is reduced. For the convergence of both frequencies in particular, it is proposed here to reduce the higher frequency instead of increasing the lower frequency. It is therefore proposed to adjust in favor of the more slowly clocking IGBT. It is advantageous in this case, in particular, that such a procedure results in lower thermal loads.

According to one configuration, the upper band limit or the lower band limit is changed with a time constant which is a multiple of the duration of the fundamental oscillation of the electrical alternating current of the relevant phase. The change is therefore made in a correspondingly slow manner.

The switching frequencies of the upper and lower switches are preferably determined over a half-wave of a fundamental oscillation. It is proposed, in particular, to record the number of switching actions over one half-wave and to divide it by the duration of the half-wave.

The band limits are preferably changed by applying a correction value to the band limits, in particular as a variable correction value, in particular by means of a PI controller, on the basis of a DC offset.

The absolute value of the shift of at least one band limit can therefore be selected on the basis of the absolute value of the captured DC offset which was captured by means of the different switching frequencies, for example. The correction value is applied to the respective band limit on the basis of the captured DC offset or another deviation. The band limit is therefore shifted by this correction value. In this case, the correction value can be applied as a constant correction value. It is preferably applied via a PI controller. For this purpose, the deviation, in particular the DC offset, can form an input variable for the PI controller, particularly in the sense of a control deviation. The output value of the controller then forms the correction value which, as a result, also becomes variable, at least until settling at a final value.

The upper and lower switches preferably each have at least one IGBT for generating the positive and negative sine half-waves.

The upper and lower switches are therefore implemented as IGBTs and each have, in particular, a freewheeling diode connected in parallel.

The tolerance band method preferably uses a desired current value, and the inverter is controlled on the basis of this desired current value.

The tolerance band method and the inverter are therefore current-controlled, that is to say, in particular, the current generated at the output of the inverter is captured and is fed back for the purpose of controlling the inverter.

The band limits are preferably changed on the basis of a or the desired current value.

In this case, the band limits are changed on the basis of the desired current value, in particular in such a manner that a signal component superimposed on the respective sinusoidal fundamental wave is reduced.

A or the changing of the switching frequencies of the upper and lower switches is preferably carried out for the purpose of minimizing a captured DC component.

For example, the DC component arising at the inverter output of a corresponding phase is minimized.

The disclosure also proposes a method for feeding an electrical current into an electrical supply network with a nominal system voltage by means of a wind power installation which is connected to the supply network and has at least one multiphase inverter in the form of a full converter. This method comprises the step of feeding in an electrical current by means of the full converter, wherein the full converter carries out a method described above or below for generating a multiphase electrical alternating current having a sinusoidal fundamental wave in each phase or a method according to an embodiment explained above or below.

The method according to the disclosure for generating a multiphase electrical alternating current having a sinusoidal fundamental wave in each phase is therefore used, in particular, to feed an electrical current into an electrical supply network by means of wind power installations, in particular by means of a wind power installation with a full converter concept.

In this case, a full converter concept should be understood as meaning the fact that the entire current generated by the wind power installation is conducted via an inverter or an arrangement of a plurality of inverters in such a manner that the entire current fed into the supply network has been conducted via this inverter or the arrangement of a plurality of inverters.

In this case, the combination of full converter and tolerance band method, in particular, during lasting voltage dips in the supply network provides the advantage of direct current specification, with the result that the method can be used particularly well in the field of low-voltage ride-through methods.

Provided is a wind power installation having at least one multiphase inverter for generating a multiphase electrical alternating current having a sinusoidal fundamental wave in each phase, wherein the inverter is controlled by means of a tolerance band method which respectively has an upper band limit and a lower band limit for each of the phases of the inverter, and wherein the inverter has, for each phase, at least one upper switch for generating a positive sine half-wave of the alternating current of the phase and at least one lower switch for generating a negative sine half-wave of the alternating current of the phase, characterized in that the multiphase inverter is set up to carry out a method described above or below or a method according to an embodiment described above or below.

The upper and lower switches preferably each have at least one IGBT.

A tolerance band method can therefore be implemented in an efficient manner and the proposed change of at least one band limit can be implemented.

The wind power installation preferably has at least one PI controller for changing the band limits by means of a correction value, in particular on the basis of a DC offset.

BRIEF DESCRIPTION OF THE SEVERAL VIEWS OF THE DRAWINGS

The present invention is now explained in more detail, by way of example, below on the basis of exemplary embodiments with reference to the accompanying figures.

DETAILED DESCRIPTION

Figure 1:
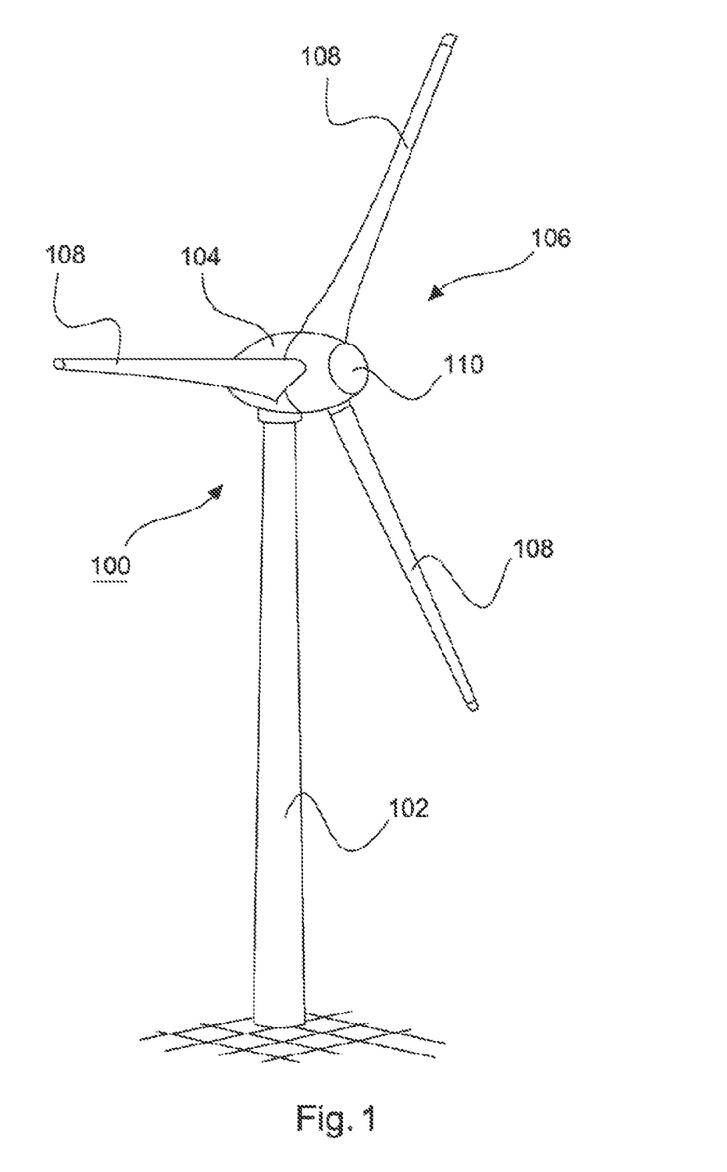
FIG. 1 shows a schematic view of a wind power installation according to one embodiment.

FIG. 1 shows a wind power installation 100 for generating a multiphase electrical alternating current having a sinusoidal fundamental wave in each phase.

For this purpose, the wind power installation 100 has a tower 102 and a nacelle 104. An aerodynamic rotor 106 having three rotor blades 108 and a spinner 110 is arranged on the nacelle 104. The rotor 106 is caused to rotate by the wind during operation and thereby drives a generator in the nacelle 104, wherein the generator is preferably in the form of a six-phase ring generator.

Figure 2:
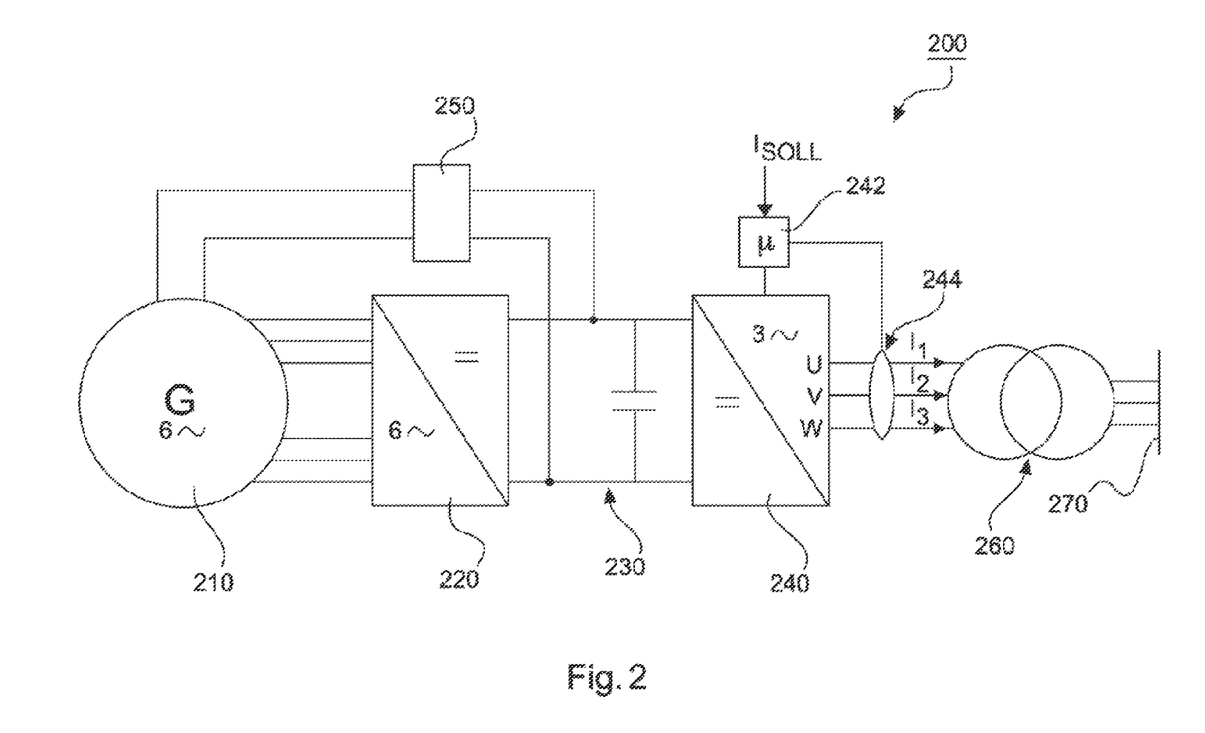
FIG. 2 shows a schematic structure of an electrical section of a wind power installation for feeding in an electrical alternating current according to one embodiment.

FIG. 2 shows, in a simplified manner, an electrical section 200 of a wind power installation shown in FIG. 1.

The electrical section 200 has a six-phase ring generator 210 which is caused to rotate by the wind via a mechanical drive train of the wind power installation in order to generate a six-phase electrical alternating current. The six-phase electrical alternating current is transferred, by the generator 210, to the rectifier 220 which is connected to the three-phase inverter 240 via a DC voltage intermediate circuit 230. The six-phase ring generator 210 which is in the form of a synchronous generator is electrically excited in this case via the excitation 250 from the DC voltage intermediate circuit 230.

The electrical section 200 therefore has a full converter concept in which the network 270 is fed by means of the three-phase inverter 240 via the wind power installation transformer 260. This network 270 is usually a wind farm network which feeds an electrical supply network via a wind farm transformer. However, feeding directly into the electrical supply network instead of the farm network 270 also comes into consideration.

In order to generate the three-phase current I1, I2, I3 for each of the phases U, V, W, the inverter 240 is controlled with a tolerance band method. In this case, the control is effected via the controller 242 which captures each of the three currents I1, I2, I3 generated by the inverter 240 by means of a current capture unit 244. The controller is therefore set up to individually control each phase of the inverter by means of the current capture unit 244. For this purpose, the controller 242 can specify a desired current value Isoll, on the basis of which the currents I1, I2, I3 are controlled. The desired current value Isoll is preferably individually calculated and specified for each phase U, V, W inside the installation.

Figure 3:
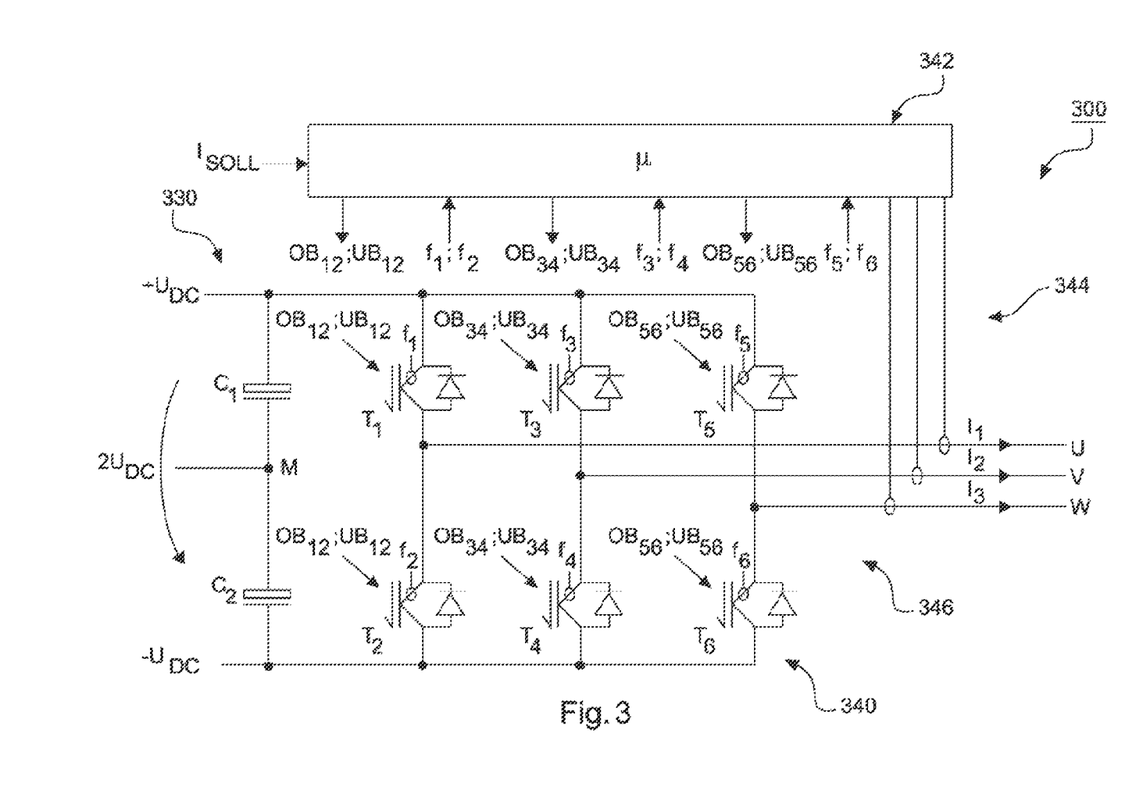
FIG. 3 schematically shows the structure of a generator apparatus for generating an electrical three-phase alternating current by means of a tolerance band method according to one embodiment.

FIG. 3 schematically shows the structure of a generator apparatus 300 for generating an electrical three-phase alternating current by means of a tolerance band method. In particular, FIG. 3 shows a part which may be a part of the inverter shown in FIG. 2.

The generator apparatus 300 has a DC voltage intermediate circuit 330 which is connected to the generator of a wind power installation via a rectifier. The DC voltage intermediate circuit 330 has a first potential Udc+ and a second potential Udc− with a center tap M which is set up to be connected to a filter device in order to lead a filter connected at the output 346 of the inverter, for example, back to the DC voltage intermediate circuit 330. In addition, a capacitor having the capacitance C1, C2 is respectively arranged between the center tap M and the two potentials Udc+, Udc− in order to store energy in the DC voltage intermediate circuit 330 and to accordingly smooth the DC voltage 2Udc.

The inverter 340 which is connected to the DC voltage intermediate circuit 330 respectively generates a separate current I1, I2, I3 at the output 346 of the inverter 340 for each of the three phases U, V, W. For this purpose, the inverter 340 respectively has an upper switch T1, T3, T5 and a lower switch T2, T4, T6 for each of the three phases U, V, W, wherein the upper and lower switches T1, T2, T3, T4, T5, T6 are controlled by means of a tolerance band method, in particular via the controller 342.

The controller 342 itself operates with a current-controlled tolerance band method. For this purpose, the controller 342 captures the currents I1, I2, I3 generated by the inverter 340 at the output 346 of the inverter 340 by means of a current capture unit 344. The currents I1, I2, I3 captured in this manner are compared with a desired value Isoll in order to determine the band limits OB12, UB12, OB34, UB34, OB56, UB56 for upper and lower switches T1, T2, T3, T4, T5, T6. The controller 342 also captures the switching frequencies f1, f2, f3, f4, f5, f6 of the individual upper and lower switches T1, T2, T3, T4, T5, T6 in order to respectively change a corresponding band limit OB12, UB12, OB34, UB34, OB56, UB56, by comparing the frequencies f1, f3, f5 of the corresponding upper switches T1, T3, T5 and the frequencies f2, f4, f6 of the corresponding lower switches T2, T4, T6, in such a manner that the difference between the switching frequencies f1, f2, f3, f4, f5, f6 of the respective upper switches T1, T3, T5 and of the respective lower switches T2, T4, T6 is minimized, in particular in such a manner that a signal component of the respective phase U, V, W superimposed on the respective sinusoidal fundamental wave is reduced.

The indices of the band limits OB12, UB12, OB34, UB34, OB56, UB56 and of the switching frequencies f1, f2, f3, f4, f5, f6 each relate to the indices of the upper and lower switches T1, T2, T3, T4, T5, T6. Details of the band limits and switching frequencies are also explained, by way of example, for a first phase U in FIG. 5.

Figure 4:
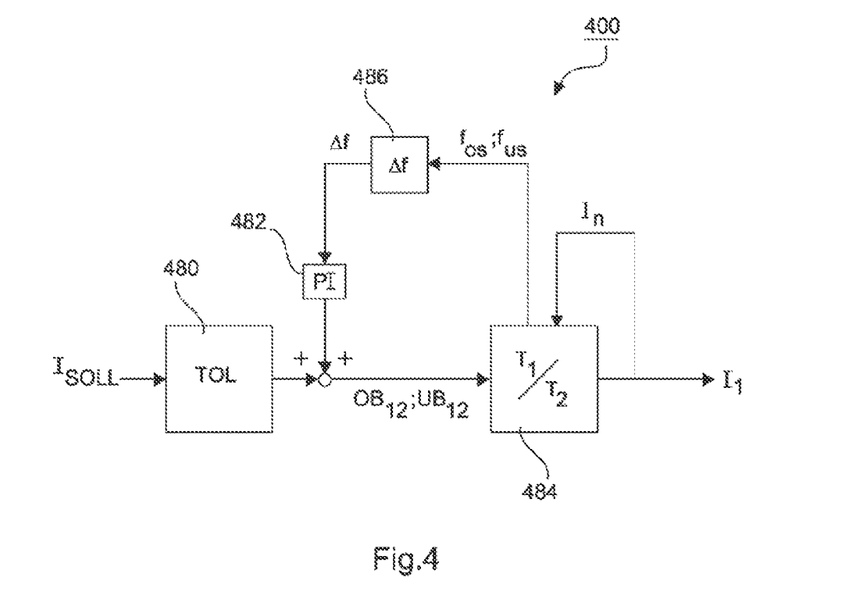
FIG. 4 shows a schematic structure of a part of the method, namely for generating a single-phase electrical alternating current of a phase having a sinusoidal fundamental wave according to one embodiment.

FIG. 4 shows the schematic structure 400 of a part of the method, in particular for generating a single-phase electrical alternating current I1 of a phase U having a sinusoidal fundamental wave.

The reference variable Isoll, that is to say the desired current value for the inverter, is passed to the tolerance block 480. The tolerance block 480 uses this to determine the corresponding band limits OB12, UB12 for the upper switch T1 and the lower switch T2 of the phase U. The upper switch T1 and the lower switch T2, which are represented by the block 484, then generate the single-phase electrical alternating current I1 of the phase U having a sinusoidal fundamental wave according to the band limits OB12, UB12, wherein the switches T1, T2 themselves have the actual switching frequencies fos, fus or are operated at said frequencies.

The actual switching frequencies fos, fus of the upper and lower switches T1, T2 are captured and are passed to a frequency block 486 which determines a frequency difference $\Delta f$ from said frequencies, that is to say the difference in the switching frequencies between the upper switch T1 and the lower switch T2. The frequency difference $\Delta f$ itself is fed back to the band limits OB12, UB12 via a PI controller 482 in order to accordingly adapt the actual switching frequency fos, fus of the switches T1, T2.

In addition, the single-phase alternating current I1 generated is determined by means of a current capture unit and is fed back to the switches T1, T2 in order to control the switches or the inverter on the basis of the current.

Figure 5:
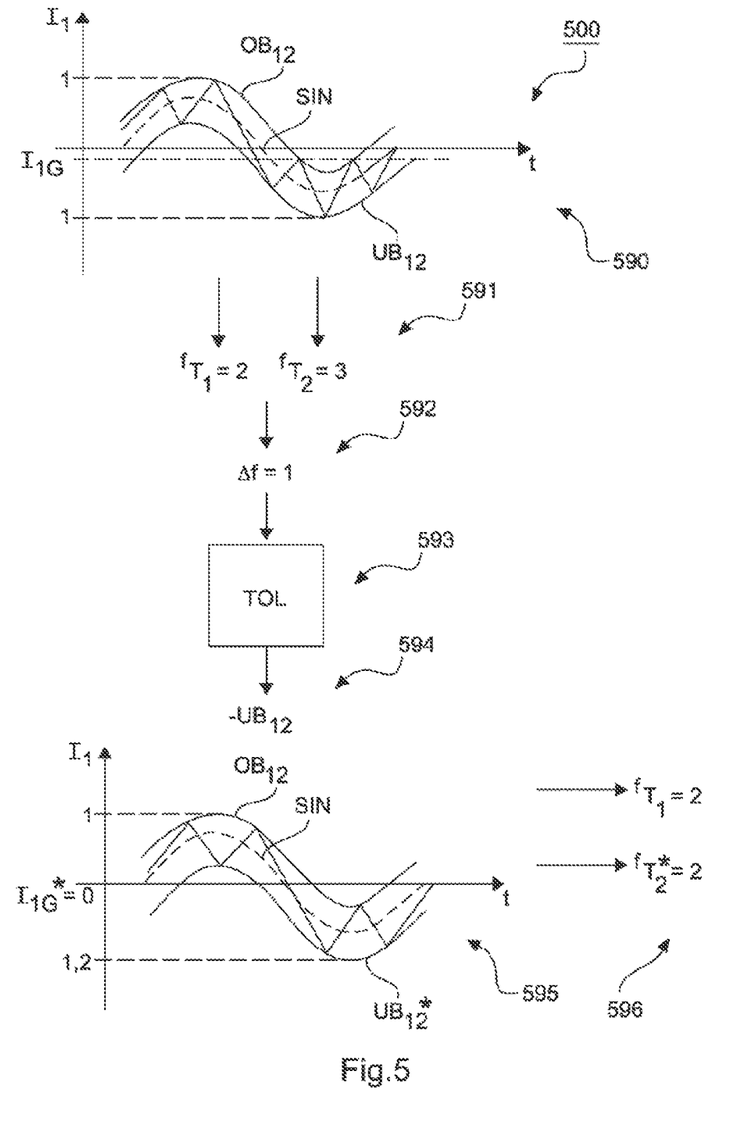
FIG. 5 illustrates a method sequence for changing a band limit for reducing a DC component of a phase according to one embodiment.

FIG. 5 illustrates a method sequence 500 for changing a band limit for the purpose of reducing a DC component of a phase according to one embodiment.

The upper and lower switches T1, T2 are controlled by means of a tolerance band method 590 and operate within the band limits OB12, UB12 which run around an optimum sine sin. The upper switch T1 operates at a first switching frequency fT1 and the lower switch T2 operates at a second switching frequency fT2. As a result, a DC component I1G is established in the phase U.

The switching frequencies fT1, fT2 are captured by a controller in a first step 591 and are compared with one another in a second step 592. The frequency difference $\Delta f$ resulting from the comparison is passed, just like the switching frequencies f1, f2, to the tolerance block 593 which uses it to determine a change in a band limit in such a manner that the signal component I1G superimposed on the respective sinusoidal fundamental wave sin is minimized.

By way of example and in a highly simplified manner, the tolerance block 593 has determined a shift of the lower band limit 594 downward for the purpose of minimizing the DC component I1G because the values 2 and 3 were measured for the switching frequencies fT1, fT2 and a frequency difference $\Delta f$ of 1 was therefore determined. This is transmitted to the upper and lower switches T1, T2.

In a next step 595, the upper and lower switches T1, T2 now operate within the band limits OB12, UB12* which run around the optimum sine sin, that is to say the sinusoidal fundamental wave. The lower band limit UB12* was therefore changed. The upper switch T1 continues to operate at the switching frequency fT1 and the lower switch operates at the new switching frequency fT2*, wherein these switching frequencies fT1, fT2* are substantially the same, namely are both 2 in the simplified example, with the result that a DC component I1G*, assumed to be 0 here, is established in the phase U but is considerably smaller than the DC component I1G. The lower band limit UB12* modified here by way of example can retain its modified value even in the case of complete correction of the DC component by using a PI controller.

In a next step 596, these switching frequencies fT1, fT2* can be captured again by the controller and can then be optimized further if necessary.

The invention claimed is:
1. A method, comprising:
   generating a multiphase electrical alternating current having a sinusoidal fundamental wave in each phase of a plurality of phases using a multiphase inverter of a wind power installation, wherein the multiphase inverter is controlled using a tolerance band method which has an upper band limit and a lower band limit for each phase of the plurality of phases of the multiphase inverter, respectively, and wherein the multiphase inverter has, for each phase of the plurality of phases, an upper switch for generating a positive sine half-wave of the alternating current of the phase and a lower switch for generating a negative sine half-wave of the alternating current of the phase;
   generating, for each phase of the plurality of phases, the positive sine half-wave by the upper switch based on the upper and lower band limits for the alternating current of the phase;
   generating, for each phase of the plurality of phases, the negative sine half-wave by the lower switch based on the upper and lower band limits for the alternating current of the phase; and
   changing at least one of the upper and lower band limits such that a signal component superimposed on the respective sinusoidal fundamental wave is reduced.

2. The method as claimed in claim 1, comprising:
capturing a DC component as the superimposed signal component.

3. The method as claimed in claim 1, comprising:
changing the at least one of the upper and lower band limits such that at least one switching frequency of the upper switch or the lower switch is changed.

4. The method as claimed in claim 1, comprising:
capturing the superimposed signal component by capturing a switching frequency of the upper switch and capturing a switching frequency of the lower switch and comparing the switching frequencies of the upper switch and of the lower switch.

5. The method as claimed in claim 1, comprising:
changing one of the upper band limit or the lower band limit such a that the superimposed signal component is reduced, wherein another one of the lower band limit or alternatively the upper band limit remains unchanged.

6. The method as claimed in claim 1, comprising:
changing at least one of the upper band limit or the lower band limit such that a difference between a switching frequency of the upper switch and a switching frequency of the lower switch is minimized.

7. The method as claimed in claim 1, comprising:
changing at least one of the upper band limit or the lower band limit such that a switching frequency of the upper switch or a switching frequency of the lower switch is reduced.

8. The method as claimed in claim 1, comprising:
changing at least one of the upper band limit or the lower band limit with a time constant that is a multiple of a duration of a fundamental oscillation of the alternating current of the phase.

9. The method as claimed in claim 1, comprising:
determining switching frequencies of the upper and lower switches over a half-wave of a fundamental oscillation.

10. The method as claimed claim 1, comprising:
changing the upper and lower band limits by applying a correction value to the upper and lower band limits.

11. The method as claimed claim 10, wherein the correction value is a variable correction value and changing the upper and lower band limits is made by a PI controller based on a DC offset.

12. The method as claimed in claim 1, wherein the upper and lower switches each have at least one IGBT for generating the positive and negative sine half-waves.

13. The method as claimed in claim 1, wherein the tolerance band method uses a desired current value, and the multiphase inverter is controlled based on the desired current value.

14. The method as claimed in claim 1, comprising:
changing the upper and lower band limits based on a desired current value.

15. A wind power installation, comprising:
at least one multiphase inverter configured to generate multiphase electrical alternating current having a sinusoidal fundamental wave in each phase of a plurality of phases, wherein the at least one multiphase inverter is controlled using a tolerance band method which respectively has an upper band limit and a lower band limit for each phase of the plurality of phases of the at least one multiphase inverter, and wherein the at least one mulitphase inverter includes:
for each phase of the plurality of phases, at least one upper switch configured to generate a positive sine half-wave of the alternating current of the phase; and
for each phase of the plurality of phases, at least one lower switch configured to generate a negative sine half-wave of the alternating current of the phase, wherein the wind power installation is configured to:
change at least one of the upper and lower band limits such that a signal component superimposed on the respective sinusoidal fundamental wave is reduced.

16. The wind power installation as claimed in claim 15, wherein the upper and lower switches each have at least one IGBT for generating the positive and negative sine half-waves.

17. The wind power installation as claimed in claim 15, comprising:
a PI controller configured to change the upper and lower band limits by a correction value based on a DC offset.

18. A method for feeding a multiphase electrical alternating current into an electrical supply network with a nominal system voltage by a wind power installation connected to the electrical supply network and has at least one multiphase inverter that is a full converter, comprising:
generating the multiphase electrical alternating current having a sinusoidal fundamental wave in each phase of a plurality of phases using the at least one multiphase inverter of the wind power installation, wherein the at least one multiphase inverter is controlled using a tolerance band method which has an upper band limit and a lower band limit for each phase of the plurality of phases of the at least one multiphase inverter, respectively, and wherein the at least one multiphase inverter has, for each phase of the plurality of phases, an upper switch for generating a positive sine half-wave of the alternating current of the phase and a lower switch for generating a negative sine half-wave of the alternating current of the phase;
generating, for each phase of the plurality of phases, the positive sine half-wave by the upper switch based on the upper and lower band limits for the alternating current of the phase;
generating, for each phase of the plurality of phases, the negative sine half-wave by the lower switch based on the upper and lower band limits for the alternating current of the phase;
changing at least one of the upper and lower band limits such that a signal component superimposed on the respective sinusoidal fundamental wave is reduced; and
feeding, into the electrical supply network, in the alternating current by the full converter.

* * * * *

UNITED STATES PATENT AND TRADEMARK OFFICE
CERTIFICATE OF CORRECTION

PATENT NO. : 10,958,077 B2
APPLICATION NO. : 16/334663
DATED : March 23, 2021
INVENTOR(S) : Ingo Mackensen et al.

Page 1 of 1

It is certified that error appears in the above-identified patent and that said Letters Patent is hereby corrected as shown below:

In the Claims

In Column 9, Claim 5, Line 18:
"alternatively the upper band limit remains unchanged."
Should read:
--the upper band limit remains unchanged.--.

In Column 9, Claim 15, Line 56:
"multiphase electrical alternating current having a sinusoidal"
Should read:
--a multiphase electrical alternating current having a sinusoidal--.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*